United States Patent
Fu et al.

(10) Patent No.: US 11,223,190 B2
(45) Date of Patent: Jan. 11, 2022

(54) EDDY CURRENT ENERGY-DISSIPATING SPACER

(71) Applicant: DALIAN UNIVERSITY OF TECHNOLOGY, Liaoning (CN)

(72) Inventors: Xing Fu, Liaoning (CN); Hongnan Li, Liaoning (CN); Wenlong Du, Liaoning (CN)

(73) Assignee: Dalian University of Technology, Liaoning (CN)

( * ) Notice: Subject to any disclaimer, the term of this patent is extended or adjusted under 35 U.S.C. 154(b) by 109 days.

(21) Appl. No.: 16/761,169

(22) PCT Filed: Feb. 21, 2019

(86) PCT No.: PCT/CN2019/075708
§ 371 (c)(1),
(2) Date: May 1, 2020

(87) PCT Pub. No.: WO2020/151040
PCT Pub. Date: Jul. 30, 2020

(65) Prior Publication Data
US 2021/0194233 A1    Jun. 24, 2021

(30) Foreign Application Priority Data

Jan. 25, 2019 (CN) .......................... 201910071863.0

(51) Int. Cl.
*H02G 7/05*    (2006.01)
*H02G 7/12*    (2006.01)
(Continued)

(52) U.S. Cl.
CPC ............. *H02G 7/125* (2013.01); *H02G 7/053* (2013.01); *H02G 7/14* (2013.01)

(58) Field of Classification Search
CPC .. H02G 7/125; H02G 7/12; H02G 7/14; F16F 15/035
See application file for complete search history.

(56) References Cited

U.S. PATENT DOCUMENTS

| 4,200,003 A | * | 4/1980 | Miller | .................. F16F 15/167 |
| | | | | 188/267.2 |
| 2018/0006443 A1 | * | 1/2018 | Tufari | ...................... H02G 7/12 |

FOREIGN PATENT DOCUMENTS

| CN | 107528279 A | | 12/2017 |
| CN | 206775076 U | * | 12/2017 |

(Continued)

OTHER PUBLICATIONS

N. Amati, A. Tonoli, A. Canova, F. Cavalli and M. Padovani, "Dynamic Behavior of Torsional Eddy-Current Dampers: Sensitivity of the Design Parameters," in IEEE Transactions on Magnetics, vol. 43, No. 7, pp. 3266-3277, Jul. 2007. (Year: 2007).*

(Continued)

*Primary Examiner* — Michael Andrews
*Assistant Examiner* — John B Freal
(74) *Attorney, Agent, or Firm* — Muncy, Geissler, Olds & Lowe, P.C.

(57) ABSTRACT

An eddy current energy-dissipating spacer is mainly composed of a spacer frame, a conductor clamp and energy-dissipating elements. The eddy current energy-dissipating spacer not only provides the function of an ordinary spacer, but also reduces the vibration of the transmission lines; and at the same time, can effectively reduce the vibration of the transmission lines, especially the torsional vibration by adopting the eddy current and viscoelastic material for energy dissipation; improves the eddy current strength by adjusting the gear radius ratio, thus increasing the damping force; can adjust the damping parameters by adjusting the magnetic field strength of the permanent magnet; can pro- (Continued)

duce long-term stable vibration reduction effect by adopting the permanent magnet to provide continuous magnetic field without additional external energy input; can effectively avoid the magnetic flux leakage of magnetic circuits by adopting the magnetic material.

5 Claims, 2 Drawing Sheets

(51) Int. Cl.
*H02G 7/14* (2006.01)
*F16F 15/03* (2006.01)

(56) References Cited

FOREIGN PATENT DOCUMENTS

| | | |
|---|---|---|
| CN | 206775076 U | 12/2017 |
| CN | 209313385 U | 8/2019 |

OTHER PUBLICATIONS

CN206775076U (Translated) (Year: 2017).*

* cited by examiner

EDDY CURRENT ENERGY-DISSIPATING SPACER

TECHNICAL FIELD

The present invention belongs to the technical field of the vibration reduction of electrical equipment and electrical transmission lines, and specifically relates to an eddy current energy-dissipating spacer.

BACKGROUND

With the gradual increase of the electricity demand in many countries and regions in the world, the span of transmission lines, the bundle number of conductors, etc., show an increasing trend, which also leads to the increasingly serious wind vibration damage to the transmission lines. The vibration of the transmission lines under the wind load cannot be ignored. In severe cases, the vibration may cause damages such as line breakage and fatigue strand breakage, which greatly threatens the safe operation of the transmission lines. In order to reduce the damages caused by the conductor vibration to the transmission lines, the effective measures must be taken to suppress the vibration. At present, the common practice is mainly to install a damping spacer, a detuning pendulum and other devices to achieve the purpose of suppressing the conductor vibration, but the vibration damping effect is relatively limited. Therefore, the development of a spacer with reasonable design and obvious damping effect will be beneficial to the transmission lines to work safely and to reduce the maintenance costs.

SUMMARY

The purpose of the present invention is to design a spacer with reasonable design and obvious damping effect.

The technical solutions of the present invention are as follows:

an eddy current energy-dissipating spacer, which is mainly composed of a spacer frame 1, a conductor clamp 2 and energy-dissipating elements 3, wherein the energy-dissipating elements 3 are mainly composed of bolts 4, a cover plate 5, a hollow cylinder 6, gears a 7, gears b 8, torsional springs 9, permanent magnets 10, a copper sheet 11 and limiting plates 12;

the spacer frame 1 is a cube frame structure;

the energy-dissipating elements 3 are fixed on four corners of the spacer frame 1;

a shell of the energy-dissipating element 3 is formed by the hollow cylinder 6 and the cover plate 5 which are connected by bolts;

there are two gears b 8, one end of which is fixed on an inner wall of the conductor clamp 2, and the other end of which penetrates through the shell or the cover plate 5 of the energy-dissipating element 3, is fixed with the torsional spring 9 and rotates around a center axis of the torsional spring 9;

there are two gears a 7 which are connected by connecting rods as a whole; and the gears a 7 are engaged with the gears b 8 and rotate around the center axis thereof, and the center axis of the gears a 7 is located at the center of the energy-dissipating element;

each energy-dissipating element 3 has two permanent magnets 10 which are respectively fixed on an inner wall of the cover plate 5 and an inner wall of the shell which is symmetrical with the cover plate 5 of the energy-dissipating element 3;

the copper sheet 11 which is located between two permanent magnets 10, is connected with the gears a 7 and rotates with the rotation of gears a 7;

the limiting plates 12, with a layer of viscoelastic material adhered to the surface thereof, are fixed on an outer surface of the cover plate 5 and an outer surface of the shell which is symmetrical with the cover plate 5 of the energy-dissipating element 3, and the conductor clamp 2 is located between two limiting plates 12, thereby achieving limiting;

the material of the viscoelastic material is rubber;

the bolts 4, the cover plate 5, the hollow cylinder 6, the gears a 7, the gears b 8 and the torsional springs 9 are made of magnetic material; and the radius of the gear a 7 is smaller than that of the gear b 8.

The operating principle of the present invention is that: when the transmission lines vibrate, the vibration of the conductor clamp will bring the gear to rotate, thus bringing the copper sheet to rotate, which generates the eddy current under the action of the magnetic field. The energy of the vibration will be converted into the heat energy due to the thermal effect of the current, thereby playing the role of reducing the vibration; a layer of viscoelastic material is adhered to a surface of the limiting plate, and when the limiting plate is impinged by the conductor clamp, the viscoelastic material will absorb part of the energy, thus playing the role of energy dissipation and vibration reduction. Specially, the radius $R_b$ of the gear b is larger than the radius $R_a$ of the gear a, so that the corners of the copper sheet can be amplified, and the amplification factor is equal to $R_b/R_a$.

The present invention has some beneficial effects:

(1) an eddy current energy-dissipating spacer of the present invention not only provides the function of an ordinary spacer, but also reduces the vibration of the transmission lines;

(2) the eddy current energy-dissipating spacer of the present invention can effectively reduce the vibration of transmission lines, especially the torsional vibration by adopting the eddy current and viscoelastic material for energy dissipation at the same time;

(3) the eddy current energy-dissipating spacer of the present invention can adjust the damping parameters by adjusting the magnetic field strength of the permanent magnet;

(4) the eddy current energy-dissipating spacer of the present invention can produce long-term stable vibration reduction effect by adopting the permanent magnet to provide continuous magnetic field without additional external energy;

(5) the eddy current energy-dissipating spacer of the present invention can effectively avoid the magnetic flux leakage of magnetic circuits by adopting the magnetic material, which not only improves the damping efficiency of the eddy current, but also avoids the influence on the surrounding components;

(6) the eddy current energy-dissipating spacer of the present invention has reasonable design and simple structure.

In figures, 1 is a spacer frame; 2 is a conductor clamp; 3 is an energy-dissipating element; 4 is a bolt, 5 is a cover plate; 6 is a hollow cylinder; 7 is a gear a; 8 is a gear b; 9 is a torsional spring; 10 is a permanent magnet; 11 is a copper sheet; and 12 is a limiting plate.

DETAILED DESCRIPTION

In order to make the purpose, features and advantages of the present invention more obvious and understandable, the technical solution in embodiments of the present invention will be clearly and fully described below in combination with drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
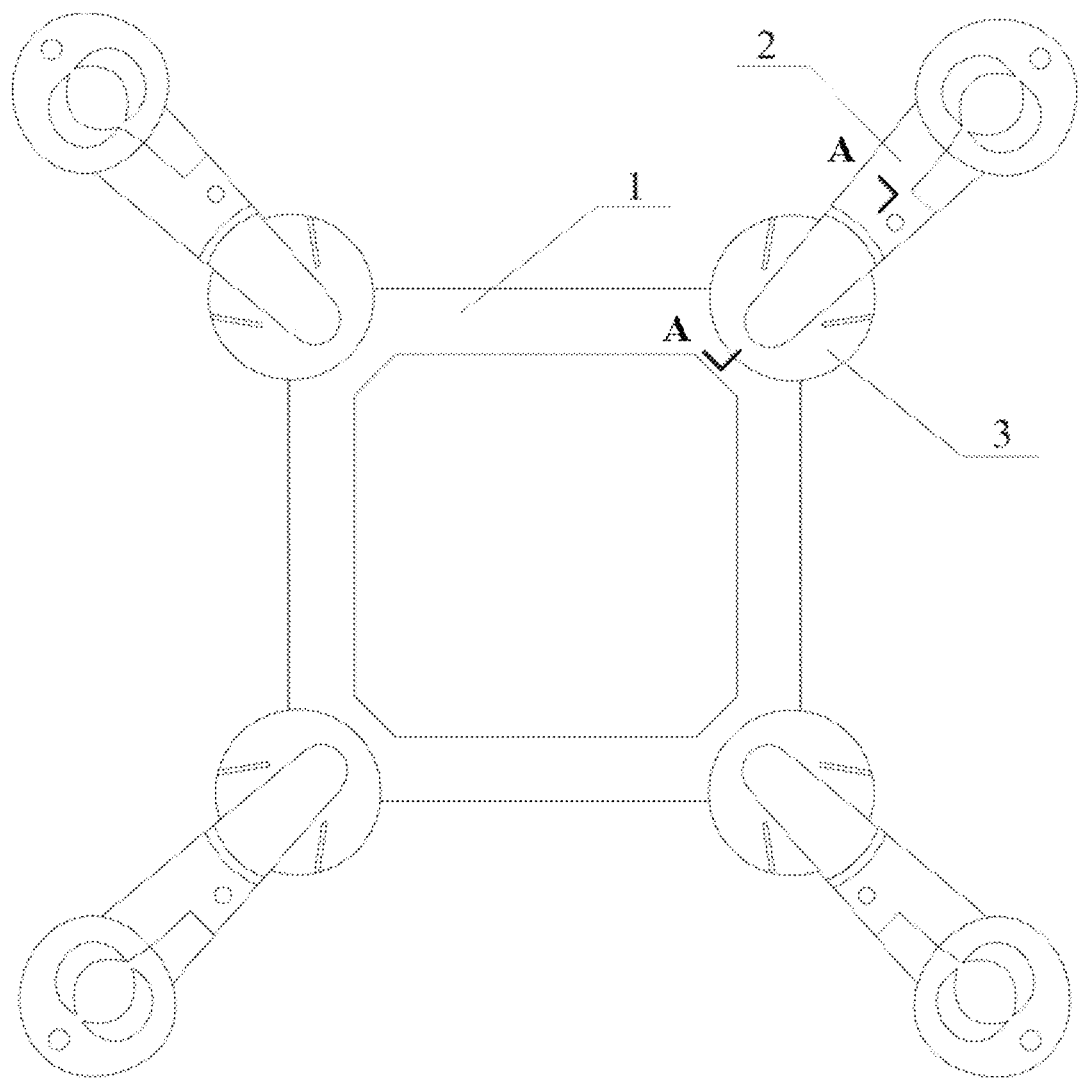
FIG. 1 is a planar diagram of an eddy current energy-dissipating spacer provided by an embodiment of the present invention.
Figure 2:
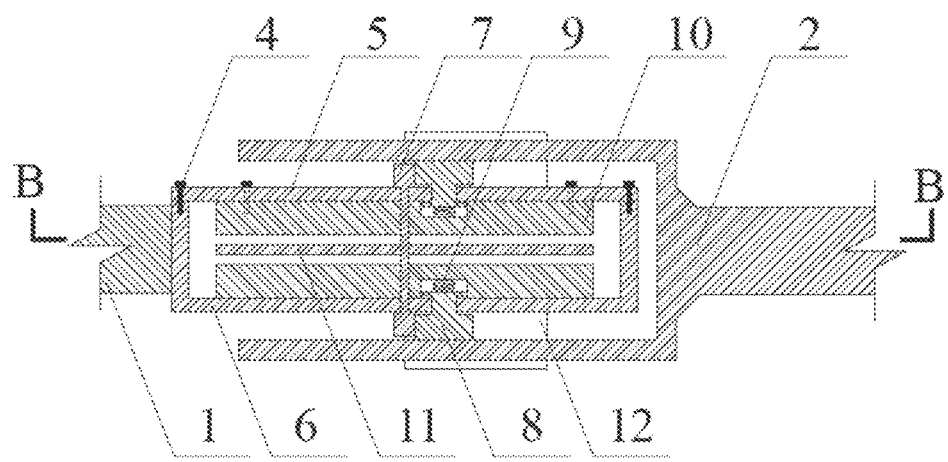
FIG. 2 is an A-A profile diagram of an eddy current energy-dissipating spacer provided by an embodiment of the present invention.
Figure 3:
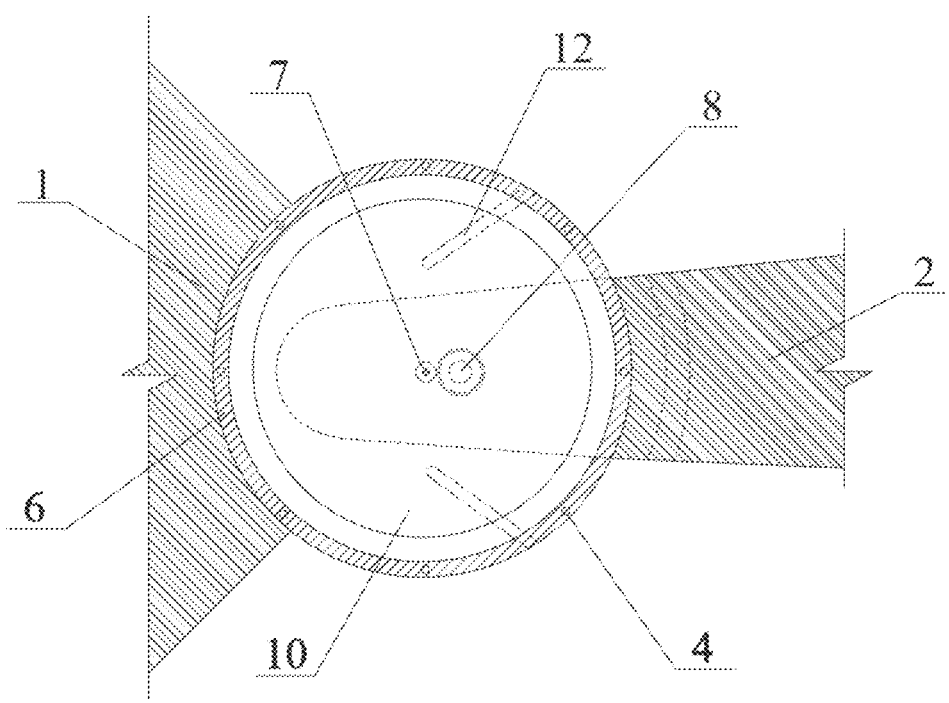
FIG. 3 is a B-B profile diagram of an eddy current energy-dissipating spacer provided by an embodiment of the present invention.

Referring to FIG. 1 to FIG. 3, an embodiment of the eddy current energy-dissipating spacer provided by the embodiment of the present invention comprises a spacer frame 1, a conductor clamp 2, energy-dissipating elements 3, bolts 4, a cover plate 5, a hollow cylinder 6, gears a 7, gears b 8, torsional springs 9, permanent magnets 10, a copper sheet 11 and limiting plates 12.

The shell of the energy-dissipating element 3 is formed by the hollow cylinder 6 and the cover plate 5 which are connected by bolts 4, in order to install and replace parts and components conveniently; one end of the gear b 8 is fixed with the conductor clamp 2, and the other end penetrates through the shell of the energy-dissipating element 3 and is fixed with the torsional spring 9, and when the conductor clamp 2 rotates, the gear b 8 is driven to rotate; the gear a 7 is engaged with the gear b 8, and the rotation of gear b 8 drives the rotation of the gear a 7, and the radius of the gear b 8 is larger than that of the gear a 7, which can make the gear a 7 rotate at a greater angle, thereby generating the higher intensity of eddy current; the torsion spring 9 can restore the original position of the conductor clamp 2 after rotation; each energy-dissipating element 3 has two permanent magnets 10 which are respectively fixed on the front and rear sides of the energy-dissipating element 3; the copper sheet 11 is located between the two permanent magnets 10, is connected with the gear a 7 and rotates with the rotation of the gear a 7, thus cutting the magnetic induction line between the two permanent magnets 10 to generate the eddy current; the limiting plates 12 are fixed on the outside of the energy-dissipating element 3, a layer of viscoelastic material is adhered to the surface thereof, and the conductor clamp 2 is located between two limiting plates 12, which can prevent the overlarge rotation angle of the conductor clamp 2; the material of the viscoelastic material is rubber; and the bolts 4, the cover plate 5, the hollow cylinder 6, the gears a 7, the gears b 8 and the torsional springs 9 are made of magnetic material, avoiding the influence of the magnetic flux leakage on the normal operation of other components.

An eddy current energy-dissipating spacer of the present invention not only provides the function of an ordinary spacer, but also reduces the vibration of the transmission lines. It can reduce the vibration of the transmission effectively at the same time, especially the torsional vibration by adopting the eddy current and viscoelastic material for energy dissipation; can adjust the damping parameters by adjusting the magnetic field strength of the permanent magnet 10; can provide the long-term stable vibration reduction effect by adopting the permanent magnet 10 to provide continuous magnetic field without additional external energy due to the fact that the physical properties of each control unit remain unchanged for a long time; can effectively avoid the magnetic flux leakage of the magnetic circuits by adopting the magnetic material, which not only improves the damping efficiency of the eddy current, but also avoids the influence on various surrounding components; and has reasonable design and simple construction, and is easy to produce and install. Since the transmission lines are under the wind load almost at any time and earthquakes are rare, the application of the eddy current energy-dissipating spacer on the wind resistance of the transmission lines is more important.

Attention needs be paid to the design of the present invention: first, the radius $R_b$ of the gear b is larger than the radius $R_a$ of the gear a, so that the corners of the copper sheet can be amplified, and the amplification factor is equal to $R_b/R_a$; second, the limiting plate 12 should have enough rigidity and strength to avoid the damage caused by the collision between the conductor clamp 2 and the limiting plate; and third, both sides of the gear a 7 and the inside of the gear b 8 should be left with a small gap for easy rotation, and the lubricating oil should be applied to the gear to reduce the rotation friction of the gear at the same time.

The above embodiments of the present invention do not limit the protection scope of the present invention, and the embodiments of the present invention are not limited to this. According to the above contents of the present invention, in accordance with the common technical knowledge and the conventional methods in the art, other various modifications, replacements or changes made to the above structure of the present invention shall fall within the protection scope of the present invention without departing from the above basic technical thought of the present invention.

The invention claimed is:

1. An eddy current energy-dissipating spacer, wherein the eddy current energy-dissipating spacer is composed of a spacer frame, a conductor clamp and energy-dissipating elements, wherein the energy-dissipating elements are composed of bolts, a cover plate, a hollow cylinder, gears a, gears b, torsional springs, permanent magnets, a copper sheet and limiting plates;

the spacer frame is a cube frame structure;

the energy-dissipating elements are fixed on four corners of the spacer frame;

a shell of the energy-dissipating element is formed by the hollow cylinder and the cover plate which are connected by bolts;

there are two gears b, one end of which is fixed on an inner wall of the conductor clamp, and the other end of which penetrates through the shell of the energy-dissipating element, is fixed with the torsional spring and rotates around a center axis of the torsional spring;

there are two gears a which are connected by connecting rods as a whole; and the gears a are engaged with the gears b and rotate around the center axis thereof, and the center axis of the gears a is located at the center of the energy-dissipating element;

each energy-dissipating element has two permanent magnets which are respectively fixed on an inner wall of the cover plate and an inner wall of the hollow cylinder which is symmetrical with the cover plate of the energy-dissipating element;

the copper sheet, which is located between two permanent magnets, is connected with the connecting rod and rotates with the rotation of the connecting rod; and the limiting plates, with a layer of viscoelastic material adhered to the surface thereof, are fixed on an outer surface of the cover plate and an outer surface of the hollow cylinder which is symmetrical with the cover plate of the energy-dissipating element, and the conductor clamp is located between two limiting plates, thereby achieving limiting.

2. The eddy current energy-dissipating spacer according to the claim 1, wherein the gear a has a radius that is smaller than a radius of the gear b.

3. The eddy current energy-dissipating spacer according to the claim 1, wherein a material of the viscoelastic material is rubber.

4. The eddy current energy-dissipating spacer according to the claim 1, wherein the bolts, the cover plate, the hollow cylinder, the gears a, the gears b and the torsional springs are all made of magnetic material.

5. The eddy current energy-dissipating spacer according to the claim 3, wherein the bolts, the cover plate, the hollow cylinder, the gears a, the gears b and the torsional springs are all made of magnetic material.

* * * * *